(12) United States Patent
Oshida

(10) Patent No.: US 11,273,807 B2
(45) Date of Patent: Mar. 15, 2022

(54) CONTROLLER, CONTROL METHOD, AND BRAKE SYSTEM

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 16/500,440

(22) PCT Filed: Mar. 13, 2018

(86) PCT No.: PCT/IB2018/051648
§ 371 (c)(1),
(2) Date: Oct. 3, 2019

(87) PCT Pub. No.: WO2018/185578
PCT Pub. Date: Oct. 11, 2018

(65) Prior Publication Data
US 2020/0189536 A1 Jun. 18, 2020

(30) Foreign Application Priority Data

Apr. 5, 2017 (JP) .............................. JP2017-074870

(51) Int. Cl.
*B60T 8/17* (2006.01)
*B60W 10/06* (2006.01)
(Continued)

(52) U.S. Cl.
CPC ........... *B60T 8/1706* (2013.01); *B60W 10/06* (2013.01); *B60T 8/17554* (2013.01);
(Continued)

(58) Field of Classification Search
CPC ...... B60T 8/1706; B60T 8/3225; B60T 8/261; B60T 7/22; B60W 10/06; B60W 10/184; B60W 2300/36
See application file for complete search history.

(56) References Cited

U.S. PATENT DOCUMENTS 5,416,708 A * 5/1995 Matsuto ................ B60T 8/1706
303/137
9,010,878 B2 * 4/2015 Takenouchi .......... B60T 8/4081
303/9.64
(Continued)

FOREIGN PATENT DOCUMENTS

EP 2487081 8/2012
EP 3124370 2/2017
(Continued)

OTHER PUBLICATIONS

International Search Report for Application No. PCT/IB2018/051648 dated Jun. 13, 2018 (English Translation, 3 pages).

*Primary Examiner* — Xuan Lan Nguyen
(74) *Attorney, Agent, or Firm* — Michael Best & Friedrich LLP

(57) ABSTRACT

The invention obtains a controller and a control method capable of improving safety by an automatic braking operation while preventing a motorcycle from falling over. The invention also obtains a brake system that includes such a controller.

In the controller and the control method according to the invention, a control mode that makes the motorcycle execute the automatic braking operation is initiated in response to trigger information generated in accordance with peripheral environment of the motorcycle. In the control mode, distribution of an automatic braking force to a front wheel and a rear wheel is controlled in accordance with travel posture of the motorcycle, and the automatic braking force is a braking force that is applied to the wheels of the motorcycle by the automatic braking operation.

8 Claims, 6 Drawing Sheets

(51) Int. Cl.
  *B60T 8/1755*  (2006.01)
  *B60T 8/32*  (2006.01)
  *B60W 10/184*  (2012.01)

(52) U.S. Cl.
  CPC .......... *B60T 8/3225* (2013.01); *B60W 10/184* (2013.01); *B60W 2300/36* (2013.01); *B60W 2554/00* (2020.02); *B60W 2710/18* (2013.01); *B60W 2720/106* (2013.01)

(56) References Cited

U.S. PATENT DOCUMENTS

| | | | | |
|---|---|---|---|---|
| 9,132,813 | B2* | 9/2015 | Matsuda | B60T 8/1706 |
| 9,440,645 | B2* | 9/2016 | Hieda | B60T 8/1706 |
| 2004/0098185 | A1 | 5/2004 | Wang | |
| 2017/0028971 | A1* | 2/2017 | Kajiyama | B60W 30/08 |
| 2017/0028972 | A1* | 2/2017 | Kajiyama | B60T 7/22 |

FOREIGN PATENT DOCUMENTS

| | | |
|---|---|---|
| JP | 2009116882 | 5/2009 |
| JP | 2010012903 | 1/2010 |
| WO | 2013115089 A1 | 8/2013 |
| WO | 2015133397 A1 | 9/2015 |
| WO | 2017030132 | 2/2017 |

* cited by examiner ic # CONTROLLER, CONTROL METHOD, AND BRAKE SYSTEM

BACKGROUND OF THE INVENTION

The present disclosure relates to a controller and a control method capable of improving safety by an automatic braking operation while preventing a motorcycle from falling over, and to a brake system that includes such a controller.

As a conventional technique related to a motorcycle, a technique of improving driver safety has been available.

For example, a driver assistance system is disclosed in JP-A-2009-116882. Based on information detected by a sensor that detects presence of an obstacle in a travel direction or substantially in the travel direction, the driver assistance system warns a driver of the motorcycle that the motorcycle inappropriately approaches the obstacle.

SUMMARY OF THE INVENTION

By the way, in order to further improve the driver safety, it is considered to use a technique of avoiding a collision with the forward obstacle by making the motorcycle execute an automatic braking operation that is a decelerating operation to apply a braking force to wheels without relying on a driver's operation. The motorcycle tends to have unstable posture when compared to a four-wheeled vehicle, for example. This leads to such a problem that the motorcycle possibly falls over when the braking force is applied to the wheels of the motorcycle by the automatic braking operation.

The invention has been made with the above-described problem as the background and therefore obtains a controller and a control method capable of improving safety by an automatic braking operation while preventing a motorcycle from falling over. The invention also obtains a brake system that includes such a controller.

A controller according to the invention is a controller that controls behavior of a motorcycle and includes: an acquisition section that acquires trigger information generated in accordance with peripheral environment of the motorcycle; and an execution section that initiates a control mode in response to the trigger information, the control mode making the motorcycle execute an automatic braking operation. In the control mode, distribution of an automatic braking force to a front wheel and a rear wheel is controlled in accordance with travel posture of the motorcycle, and the automatic braking force is a braking force that is applied to the wheels of the motorcycle by the automatic braking operation.

A control method according to the invention is a control method controlling behavior of a motorcycle and includes: an acquisition step of acquiring trigger information that is generated in accordance with peripheral environment of the motorcycle; and an execution step of initiating a control mode in response to the trigger information, the control mode making the motorcycle execute an automatic braking operation. In the control mode, distribution of an automatic braking force to a front wheel and a rear wheel is controlled in accordance with travel posture of the motorcycle, and the automatic braking force is a braking force that is applied to the wheels of the motorcycle by the automatic braking operation.

A brake system according to the invention is a brake system that includes: a peripheral environment sensor that detects peripheral environment of a motorcycle; and a controller that controls behavior of the motorcycle on the basis of the peripheral environment. The controller includes: an acquisition section that acquires trigger information generated in accordance with the peripheral environment; and an execution section that initiates a control mode in response to the trigger information, the control mode making the motorcycle execute an automatic braking operation. In the control mode, distribution of an automatic braking force to a front wheel and a rear wheel is controlled in accordance with travel posture of the motorcycle, and the automatic braking force is a braking force that is applied to the wheels of the motorcycle by the automatic braking operation.

In the controller, the control method, and the brake system according to the invention, the control mode that makes the motorcycle execute the automatic braking operation is initiated in response to the trigger information that is generated in accordance with the peripheral environment of the motorcycle. In the control mode, the distribution of the automatic braking force to the front wheel and the rear wheel is controlled in accordance with the travel posture of the motorcycle, and the automatic braking force is the braking force that is applied to the wheels of the motorcycle by the automatic braking operation. In this way, the automatic braking force can appropriately be distributed to the front wheel and the rear wheel in accordance with the travel posture of the motorcycle. Therefore, safety can be improved by the automatic braking operation while motorcycle is prevented from falling over.

DETAILED DESCRIPTION

Figure 1:
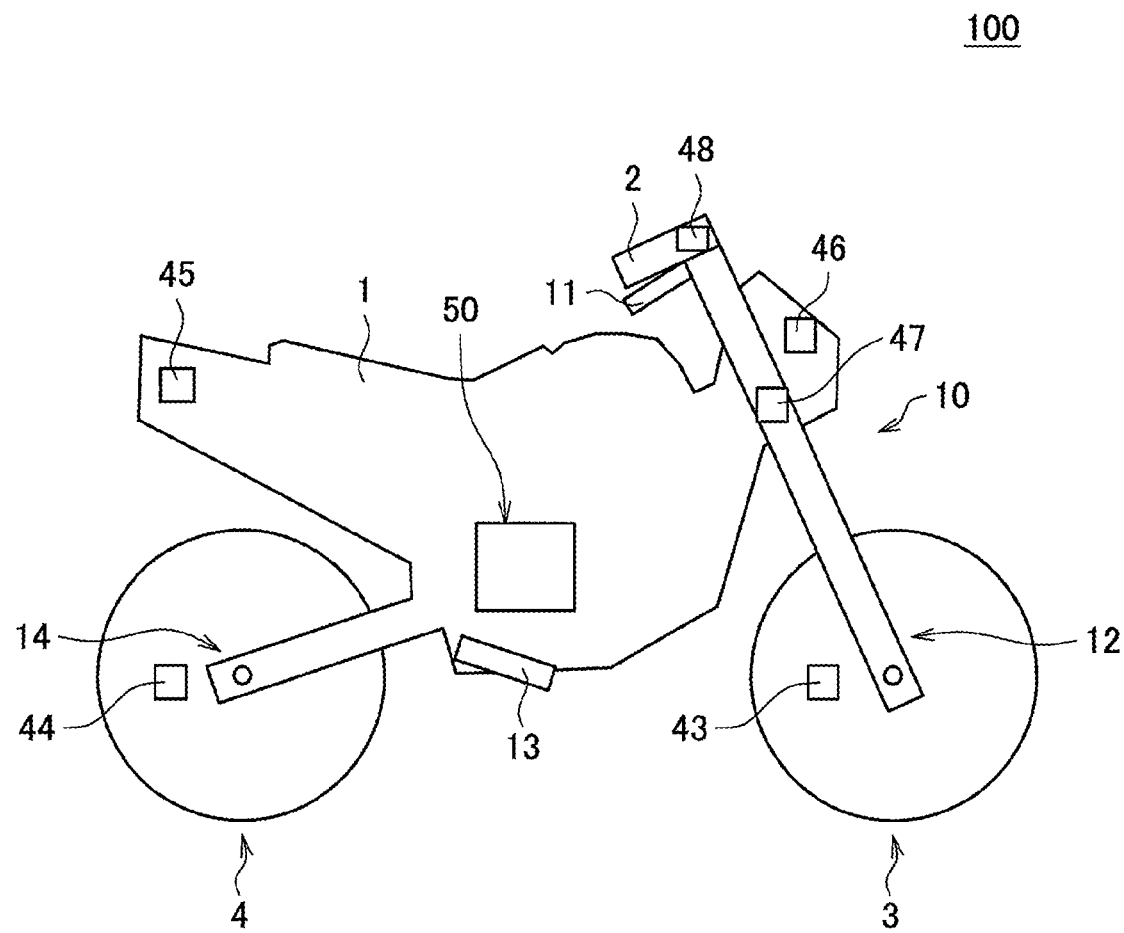
FIG. 1 is a schematic view of an exemplary configuration of a motorcycle on which a brake system according to an embodiment of the invention is mounted.

A description will hereinafter be made on a controller, a control method, and a brake system according to the invention by using the drawings. Note that a description will hereinafter be made on a case where a motorcycle is a two-wheeled motor vehicle; however, the motorcycle may be another motorcycle such as a three-wheeled motor vehicle. In addition, a description will be made on a case where each of a front-wheel brake mechanism and a rear-wheel brake mechanism is provided in one unit; however, at least one of the front-wheel brake mechanism and the rear-wheel brake mechanism may be provided in multiple units.

A configuration, an operation, and the like, which will be described below, constitute merely one example, and the controller, the control method, and the brake system according to the invention are not limited to a case with such a configuration, such an operation, and the like.

The same or similar description will appropriately be simplified or will not be made below. In the drawings, the same or similar members or portions will not be denoted by a reference sign or will be denoted by the same reference sign. In addition, a detailed structure will appropriately be depicted in a simplified manner or will not be depicted.

<Configuration of Brake System>

Figure 2:
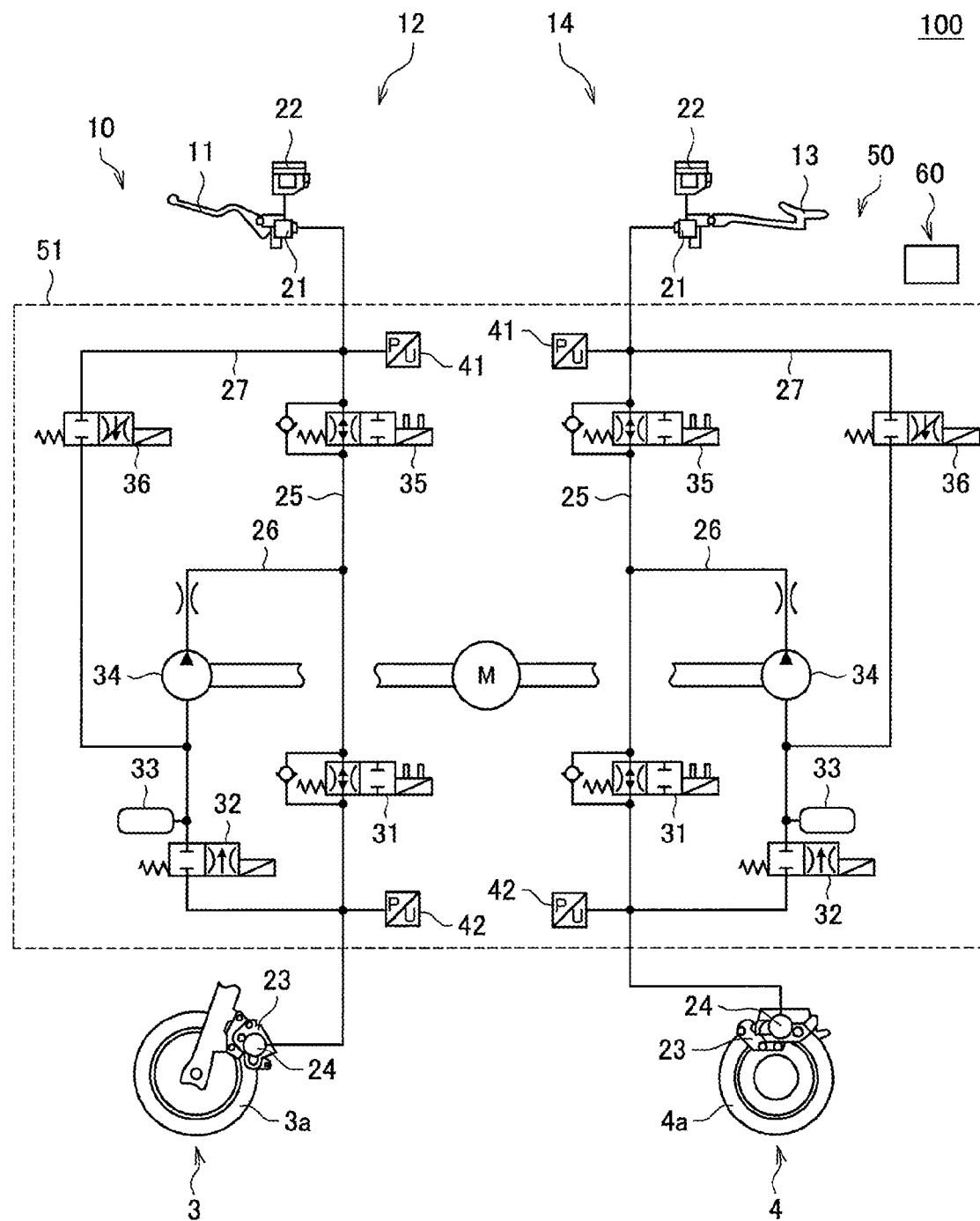
FIG. 2 is a schematic view of an exemplary configuration of the brake system according to the embodiment of the invention.
Figure 3:
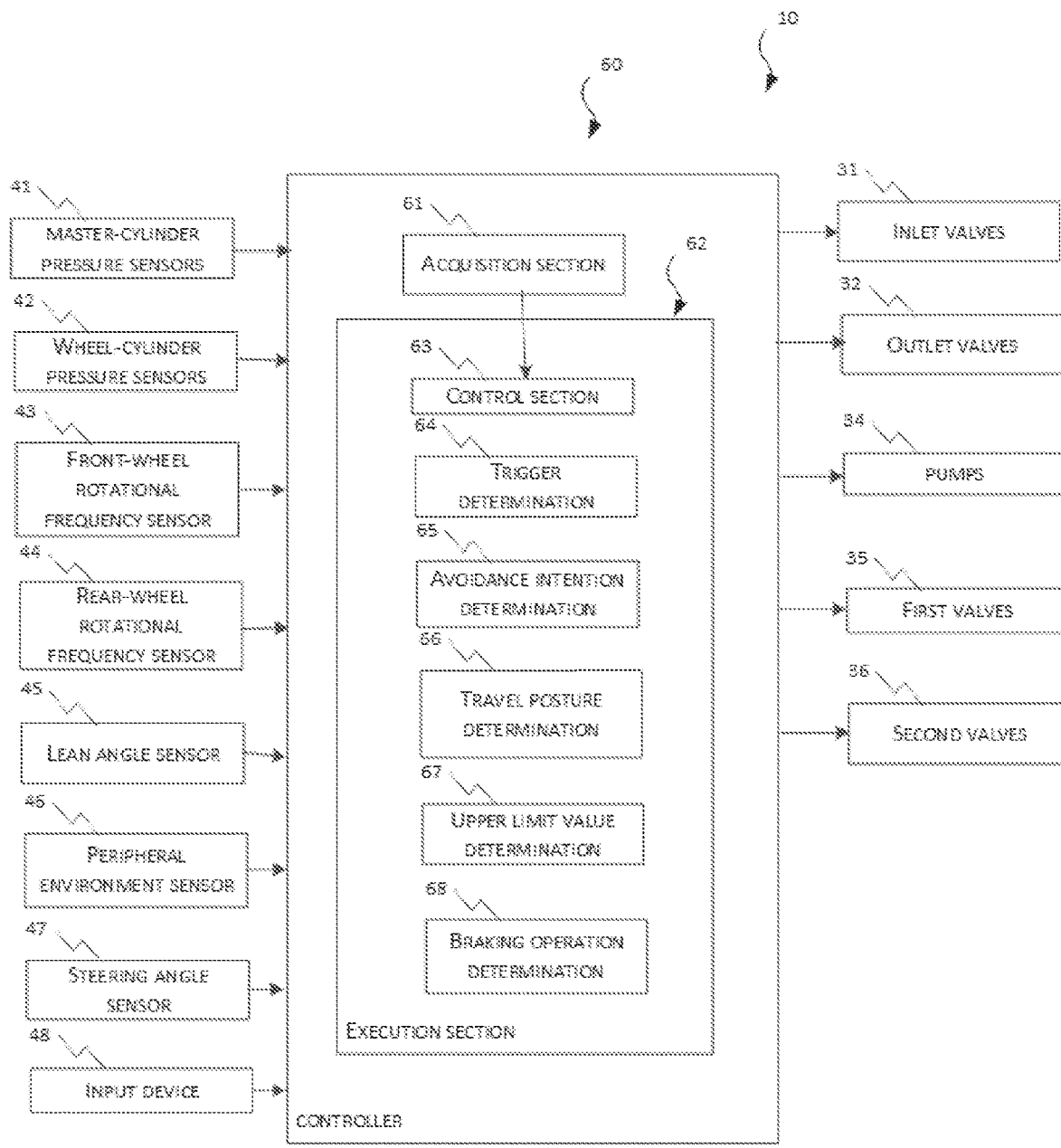
FIG. 3 is a block diagram of an exemplary functional configuration of a controller according to the embodiment of the invention.
Figure 4:
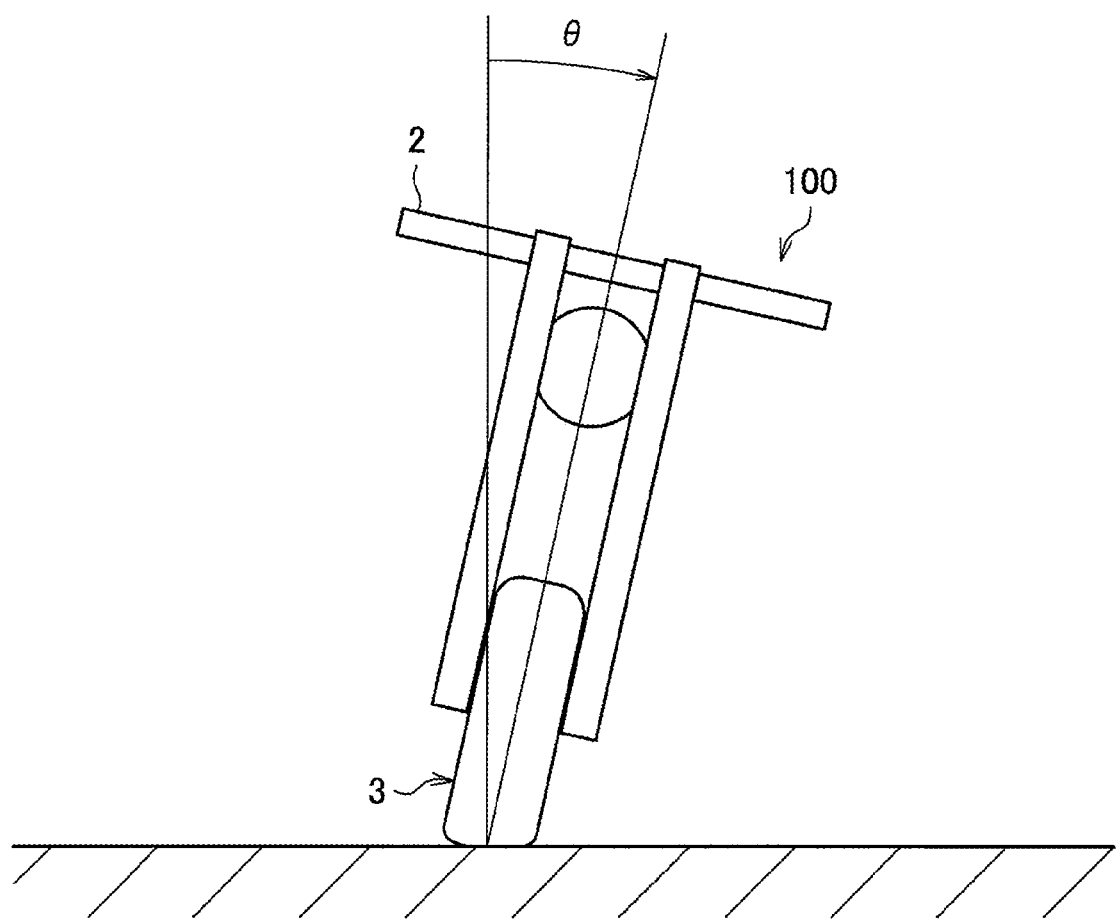
FIG. 4 is a view illustrating a lean angle.

A description will be made on a configuration of a brake system 10 according to an embodiment of the invention. FIG. 1 is a schematic view of an exemplary configuration of a motorcycle 100 on which a brake system 10 according to the embodiment of the invention is mounted. FIG. 2 is a schematic view of an exemplary configuration of the brake system 10 according to the embodiment of the invention. FIG. 3 is a block diagram of an exemplary functional configuration of a controller 60 according to the embodiment of the invention. FIG. 4 is a view illustrating a lean angle.

As depicted in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and is operated by a driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. A first valve (USV) 35 is provided in a portion of the primary channel 25 that is between an end of the primary channel 25 on the master cylinder 21 side and a portion of the primary channel 25 to which a downstream end of the secondary channel 26 is connected. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in the unenergized state and opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and the controller (ECU) 60. In the brake system 10, the hydraulic pressure control unit 50 is a unit that has a function of controlling a hydraulic pressure of the brake fluid in each of the wheel cylinders 24, that is, a braking force to be applied to the front wheel 3 by the front-wheel brake mechanism 12 and a braking force to be applied to the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, that is, in a state where an automatic braking operation, which will be described below, is not executed, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) in the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not depicted) in the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby applied to the rear wheel 4.

As depicted in FIG. 2 and FIG. 3, the brake system 10 includes master-cylinder pressure sensors 41, wheel-cylinder pressure sensors 42, a front-wheel rotational frequency sensor 43, a rear-wheel rotational frequency sensor 44, a lean angle sensor 45, a peripheral environment sensor 46, a steering angle sensor 47, and an input device 48, for example. Each of the sensors and the input device 48 is communicable with the controller 60. The peripheral environment sensor 46 is communicable with the input device 48.

Each of the master-cylinder pressure sensors 41 detects a hydraulic pressure of the brake fluid in the master cylinder 21 and outputs a detection result. Each of the master-cylinder pressure sensors 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

Each of the wheel-cylinder pressure sensors 42 detects the hydraulic pressure of the brake fluid in the wheel cylinder 24 and outputs a detection result. Each of the wheel-cylinder pressure sensors 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The front-wheel rotational frequency sensor 43 and the rear-wheel rotational frequency sensor 44 are respectively provided on the front wheel 3 and the rear wheel 4.

The lean angle sensor 45 detects the lean angle of the motorcycle 100 and an angular velocity of the lean angle thereof, and outputs a detection result. For example, the lean angle corresponds to a tilt angle θ of the motorcycle 100 in a rolling direction with respect to an upper vertical direction depicted in FIG. 4. Note that the motorcycle 100 is basically tilted in the rolling direction with respect to the upper vertical direction during turning travel. More specifically, an inertial measurement unit (IMU) that includes a three-axis gyroscope sensor and a three-directional acceleration sensor is used as the lean angle sensor 45. The lean angle sensor 45 may detect another physical quantity that can substantially be converted to the lean angle of the motorcycle 100 and the angular velocity of the lean angle thereof. The lean angle sensor 45 is provided in the trunk 1.

The peripheral environment sensor 46 detects peripheral environment of the motorcycle 100. For example, as the peripheral environment, the peripheral environment sensor 46 detects a distance from the motorcycle 100 to a forward obstacle (for example, a preceding vehicle). The peripheral environment sensor 46 may detect another physical quantity that can substantially be converted to the distance from the motorcycle 100 to the forward obstacle. More specifically, a camera that captures an image in front of the motorcycle 100 or a distance measurement sensor that can detect the distance from the motorcycle 100 to the forward obstacle is used as the peripheral environment sensor 46. The peripheral environment sensor 46 is provided in a front portion of the trunk 1.

In addition, the peripheral environment sensor 46 generates trigger information in accordance with the peripheral environment and outputs the trigger information. The trigger information is used to determine initiation of a control mode, which will be described below. Furthermore, the peripheral environment sensor 46 computes a target braking force in conjunction with generation of the trigger information and outputs a computation result. The target braking force is a target value of an automatic braking force that is the braking force applied to the wheels of the motorcycle 100 by the automatic braking operation executed in the control mode.

For example, the peripheral environment sensor 46 computes a body speed of the motorcycle 100 on the basis of the rotational frequencies of the front wheel 3 and the rear wheel 4, and estimates duration before arrival on the basis of the distance from the motorcycle 100 to the forward obstacle and the body speed. The duration before arrival is duration before the motorcycle 100 reaches the forward obstacle. In the case where the duration before arrival is shorter than reference duration, the peripheral environment sensor 46 generates the trigger information that is used to determine the initiation of the control mode in which an automatic emergency braking operation is executed as the automatic braking operation. The automatic emergency braking operation is the automatic braking operation that is executed to make the motorcycle 100 stop before reaching the forward obstacle. The reference duration is set in accordance with estimated duration before the motorcycle 100 stops in the case where the motorcycle 100 executes the automatic emergency braking operation.

In this case, more specifically, the peripheral environment sensor 46 computes the braking force with which the motorcycle 100 can stop before reaching the forward obstacle by the automatic emergency braking operation as the target braking force. Such a target braking force is computed on the basis of the distance from the motorcycle 100 to the forward obstacle and the body speed, for example.

In addition, for example, in the case where the distance from the motorcycle 100 to the preceding vehicle falls below a distance reference value when the driver selects an automatic cruise travel mode, which will be described below, the peripheral environment sensor 46 generates the trigger information that is used to determine the initiation of the control mode in which an automatic cruise braking operation is executed as the automatic braking operation. The automatic cruise braking operation is the automatic braking operation that is executed to make the distance from the motorcycle 100 to the preceding vehicle approximate the distance reference value. As the distance from the motorcycle 100 to the preceding vehicle, the distance reference value is set to such a value that the driver safety can be secured.

In this case, more specifically, the peripheral environment sensor 46 computes the braking force with which the distance from the motorcycle 100 to the preceding vehicle can promptly approximate the distance reference value while a collision of the motorcycle 100 with the preceding vehicle is avoided by the automatic cruise braking operation, and sets such a braking force as the target braking force. Such a target braking force is computed on the basis of the body speed and a difference between the distance from the motorcycle 100 to the preceding vehicle and the distance reference value, for example.

The steering angle sensor 47 detects a steering angle of the motorcycle 100 and an angular velocity of the steering angle thereof, and outputs a detection result. The steering angle sensor 47 may detect another physical quantity that can substantially be converted to the steering angle of the motorcycle 100 and the angular velocity of the steering angle thereof. The steering angle sensor 47 is provided on the handlebar 2.

The input device 48 receives a travel mode selection operation by the driver and outputs information indicative of the received operation. As the travel mode, the input device 48 at least receives the selection operation to select the automatic cruise travel mode. The automatic cruise travel mode is a travel mode in which the motorcycle 100 continues traveling with behavior thereof being at least partially controlled automatically. In the automatic cruise travel mode, the motorcycle 100 is controlled such that the distance therefrom to the preceding vehicle approximates the distance reference value. For example, a lever, a button, or a touch panel may be used as the input device 48. The input device 48 is provided on the handlebar 2, for example.

The controller 60 controls the behavior of the motorcycle 100. The controller 60 includes an acquisition section 61 and an execution section 62, for example. The acquisition section 61 acquires the information that is output from each of the sensors and the input device 48, and outputs the acquired information to the execution section 62. The execution section 62 includes a control section 63, a trigger determination section 64, an avoidance intention determination section 65, a travel posture determination section 66, an upper limit value determination section 67, and a braking operation determination section 68, for example. Each of the determination sections executes determination processing by using the information that is output from each of the sensors. In accordance with a determination result by the trigger determination section 64, the execution section 62 initiates the control mode that makes the motorcycle 100 execute the automatic braking operation. In the control mode, the control section 63 outputs a command that governs the operations of the inlet valves 31, the outlet valves 32, the pumps 34, the first valves 35, the second valves 36, and the like in accordance with the determination result by each of the determination sections, so as to control the automatic braking force that is the braking force applied to the wheels of the motorcycle 100 by the automatic braking operation.

More specifically, in the control mode, the control section 63 controls distribution of the automatic braking force to the front wheel 3 and the rear wheel 4 in accordance with the travel posture of the motorcycle 100.

The controller 60 includes a storage element, and the information such as the reference values used in the processing executed by the controller 60 may be stored in the storage element in advance.

In the automatic cruise travel mode, an automatic cruise drive operation is controlled by another controller that is a separate component from the controller 60 or is integrated with the controller 60, for example. The automatic cruise drive operation is an operation to accelerate the motorcycle 100 by applying drive power to the wheels of the motorcycle 100 without relying on the driver's operation. Automatic drive power as the drive power that is applied to the wheels of the motorcycle 100 during the automatic cruise drive operation may be controlled when the other controller controls engine output of the motorcycle 100.

<Operation of Brake System>

Figure 5:
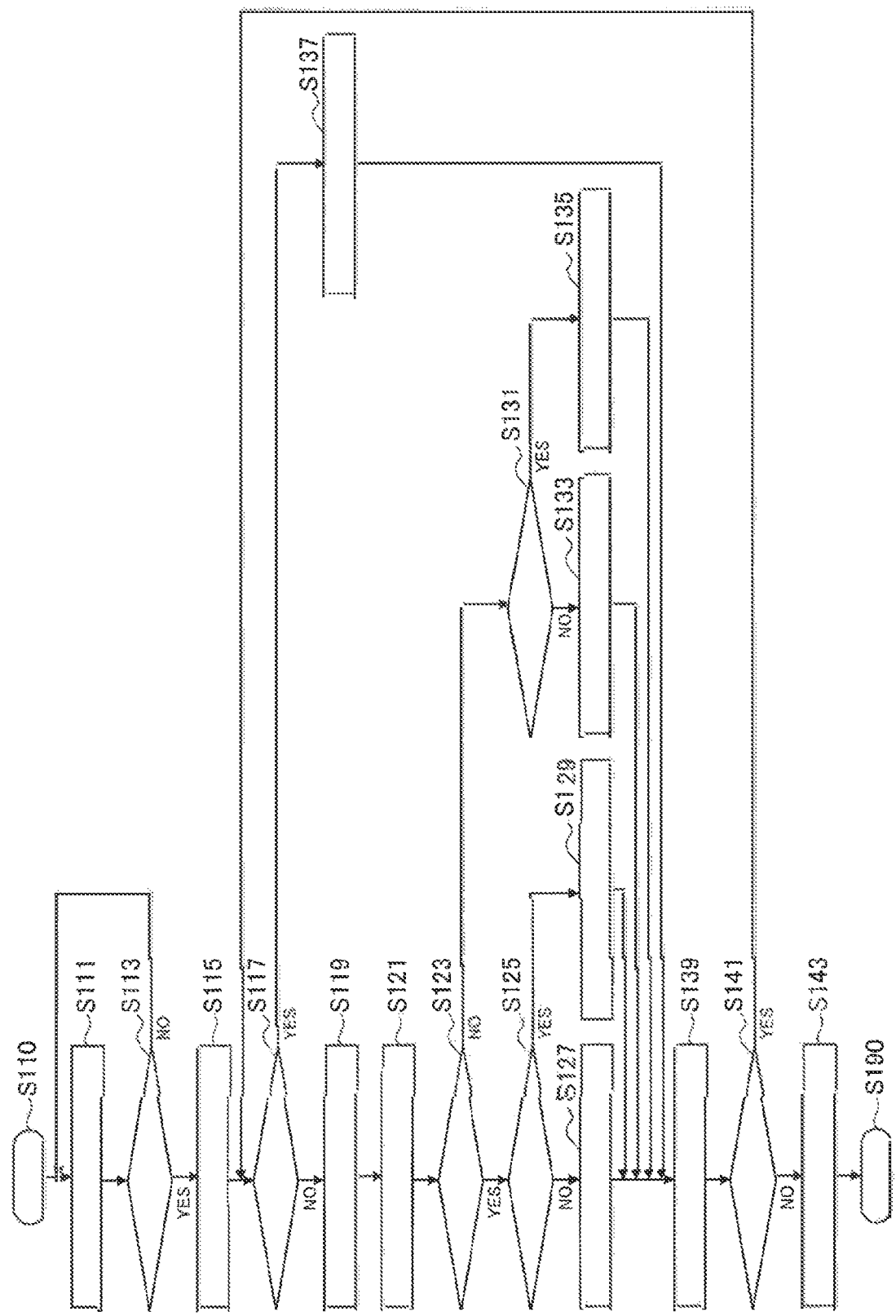
FIG. 5 is a flowchart of an example of a processing procedure that is executed by the controller according to the embodiment of the invention.
Figure 6:
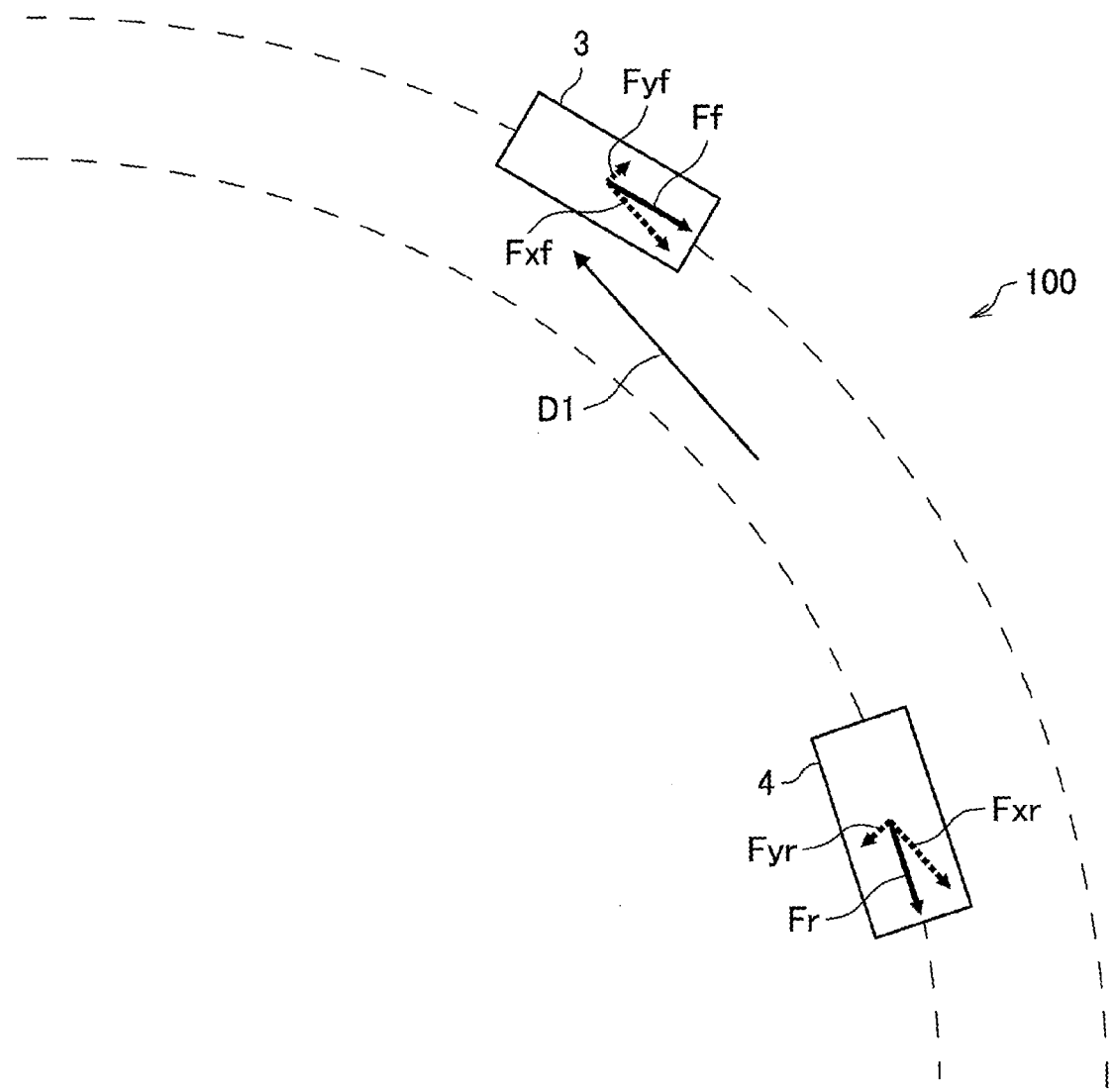
FIG. 6 is a view illustrating directions of braking forces that are applied to a front wheel and a rear wheel during turning travel.

A description will be made on an operation of the brake system 10 according to the embodiment of the invention. FIG. 5 is a flowchart of an example of a processing procedure that is executed by the controller 60 according to the embodiment of the invention. FIG. 6 is a view illustrating directions of the braking forces that are applied to the front wheel 3 and the rear wheel 4 during the turning travel.

A control flow depicted in FIG. 5 is repeated during activation of the brake system 10 (in other words, during an operation of the motorcycle 100). Step S110 and step S190 in FIG. 5 respectively correspond to initiation and termination of the control flow. In step S110, the control flow is initiated in a state where the control mode is not initiated.

In step S111, the acquisition section 61 acquires the trigger information. Note that the case where the peripheral environment sensor 46 generates the trigger information has been described above; however, the controller 60 may generate the trigger information. For example, the detection result of the distance from the motorcycle 100 to the forward obstacle may be output from the peripheral environment sensor 46 to the controller 60, and the controller 60 may generate the trigger information on the basis of the distance from the motorcycle 100 to the forward obstacle. In this way, the acquisition section 61 can acquire the trigger information.

For example, in the case where the duration before the motorcycle 100 reaches the forward obstacle, which is estimated on the basis of the distance from the motorcycle 100 to the forward obstacle, is shorter than the reference duration, the controller 60 may generate the trigger information that is used to determine the initiation of the control mode in which the automatic emergency braking operation is executed as the automatic braking operation. In addition, for example, in the case where the distance from the motorcycle 100 to the preceding vehicle falls below the distance reference value when the driver selects the automatic cruise travel mode, the controller 60 may generate the trigger information that is used to determine the initiation of the control mode in which the automatic cruise braking operation is executed as the automatic braking operation.

Next, in step S113, the trigger determination section 64 determines whether the trigger information has been acquired. If it is determined that the trigger information has been acquired (step S113/YES), the processing proceeds to step S115. On the other hand, if it is determined that the trigger information has not been acquired (step S113/NO), the processing returns to step S111.

In step S115, the execution section 62 initiates the control mode to make the motorcycle 100 execute the automatic braking operation. More specifically, the execution section 62 initiates the control mode that corresponds to the trigger information acquired in step S111.

For example, in the case where the trigger information that is used to determine the initiation of the control mode to make the motorcycle 100 execute the automatic emergency braking operation is acquired in step S111, the execution section 62 initiates the control mode to make the motorcycle 100 execute the automatic emergency braking operation. Meanwhile, for example, in the case where the trigger information that is used to determine the initiation of the control mode to make the motorcycle 100 execute the automatic cruise braking operation is acquired in step S111, the execution section 62 initiates the control mode to make the motorcycle 100 execute the automatic cruise braking operation.

Next, in step S117, the avoidance intention determination section 65 determines whether the driver has an avoidance intention that is an intention to avoid the forward obstacle. If it is determined that the driver has the avoidance intention (step S117/YES), the processing proceeds to step S137. On the other hand, if it is determined that the driver does not have the avoidance intention (step S117/NO), the processing proceeds to step S119.

For example, in the case where a change rate of a state amount that is related to the posture of the motorcycle 100 during the turning travel exceeds a change rate reference value, the avoidance intention determination section 65 determines that the driver has the avoidance intention. The state amount that is related to the posture of the motorcycle 100 during the turning travel includes the lean angle, the angular velocity of the lean angle, the steering angle, or the angular velocity of the steering angle, for example. The change rate reference value is set to such a value that a determination on whether a possibility of the driver having the avoidance intention is high can be made.

For example, the avoidance intention determination section 65 determines that the driver has the avoidance intention in the case where an operation amount that is related to the operation of the motorcycle 100 by the driver exceeds an operation amount reference value. The operation of the motorcycle 100 by the driver includes an accelerator pedal operation, a brake operation, and a clutch operation, for example. The operation amount reference value is set to such a value that a determination on whether the driver has operated the motorcycle 100 can be made.

In step S119, the control section 63 permits the automatic braking operation. Once permitting the automatic braking operation, the control section 63 causes the generation of the automatic braking force that is the braking force applied to the wheels of the motorcycle 100 without relying on the driver's operation, and makes the motorcycle 100 execute the automatic braking operation. More specifically, the control section 63 brings the motorcycle 100 into a state where the inlet valves 31 are opened, the outlet valves 32 are closed, the first valves 35 are closed, and the second valves 36 are opened, so as to drive the pumps 34. In this way, the control section 63 executes pressure increasing control to increase the hydraulic pressure of the brake fluid in each of the wheel cylinders 24. The automatic braking force is thereby applied to the wheels of the motorcycle 100.

As will be described below, in the automatic braking operation, the control section 63 controls the distribution of the automatic braking force to the front wheel 3 and the rear wheel 4 in accordance with the determination result by each of the determination sections. Here, the control section 63 can execute pressure reducing control to reduce the hydraulic pressure of the brake fluid in each of the wheel cylinders 24 by controlling an opening degree of each of the first valves 35. The control section 63 controls the hydraulic pressure of the brake fluid in each of the wheel cylinders 24 by repeating the pressure increasing control and the pressure reducing control, for example. More specifically, the control section 63 controls a balance between the pressure increasing control and the pressure reducing control for each of the front-wheel brake mechanism 12 and the rear-wheel brake mechanism 14. In this way, the control section 63 can separately control the hydraulic pressure of the brake fluid in the wheel cylinder 24 of the front-wheel brake mechanism 12 and that of the rear-wheel brake mechanism 14. The control section 63 can thereby control the distribution of the automatic braking force to the front wheel 3 and the rear wheel 4.

The control section 63 distributes the automatic braking force to the front wheel 3 and the rear wheel 4 in an allocation that a sum of the automatic braking force distributed to the front wheel 3 and the automatic braking force distributed to the rear wheel 4 is equal to the target braking force. More specifically, the automatic braking force can be distributed as described above when a sum of the hydraulic pressure of the brake fluid in the wheel cylinder 24 of the front-wheel brake mechanism 12 and that of the rear-wheel brake mechanism 14 is controlled to be equal to the hydraulic pressure that corresponds to the target braking force.

Note that the case where the peripheral environment sensor 46 computes the target braking force has been described above; however, the controller 60 may compute the target braking force. For example, the detection result of the distance from the motorcycle 100 to the forward obstacle may be output from the peripheral environment sensor 46 to the controller 60, and the controller 60 may compute the target braking force on the basis of the distance from the motorcycle 100 to the forward obstacle and the body speed.

Next, in step S121, the acquisition section 61 acquires the lean angle of the motorcycle 100.

Next, in step S123, the travel posture determination section 66 determines whether the motorcycle 100 travels in such travel posture that the motorcycle 100 travels straight. If it is determined that the motorcycle 100 travels in such travel posture that the motorcycle 100 travels straight (step S123/YES), the processing proceeds to step S125. On the other hand, if it is determined that the motorcycle 100 does not travel in such travel posture that the motorcycle 100 travels straight (in other words, the motorcycle 100 travels in such travel posture that the motorcycle 100 makes a turn) (step S123/NO), the processing proceeds to step S131.

The travel posture determination section 66 determines that the motorcycle 100 travels in such travel posture that the motorcycle 100 travels straight in the case where the lean angle of the motorcycle 100 is smaller than a lean angle reference value, for example. The lean angle reference value is set to such a value that a determination on whether the lean angle of the motorcycle 100 is almost the same as the lean angle that is possibly generated during the straight travel can be made.

Note that the travel posture determination section 66 may determine whether the motorcycle 100 travels in such travel posture that the motorcycle 100 travels straight on the basis of a yaw rate generated in the motorcycle 100. For example, the travel posture determination section 66 determines that the motorcycle 100 travels in such travel posture that the motorcycle 100 travels straight in the case where the yaw rate generated in the motorcycle 100 is lower than a yaw rate reference value. The yaw rate reference value is set to such a value that a determination on whether the yaw rate generated in the motorcycle 100 is almost the same as the yaw rate that is possibly generated during the straight travel can be made. In this case, a yaw rate sensor that detects the yaw rate generated in the motorcycle 100 is mounted on the motorcycle 100, and the controller 60 can acquire the yaw rate generated in the motorcycle 100 when receiving a detection result that is output from the yaw rate sensor.

In step S125, the upper limit value determination section 67 determines whether the automatic braking force exceeds an upper limit value of the braking force that can be distributed to the rear wheel 4. If it is determined that the automatic braking force exceeds the upper limit value of the braking force that can be distributed to the rear wheel 4 (step S125/YES), the processing proceeds to step S129. On the other hand, if it is determined that the automatic braking force is equal to or smaller than the upper limit value of the braking force that can be distributed to the rear wheel 4 (step S125/NO), the processing proceeds to step S127.

For example, the upper limit value of the braking force that can be distributed to the rear wheel 4 is appropriately set in accordance with design specifications of the motorcycle 100 such as a friction coefficient between the brake pad (not depicted) of the brake caliper 23 and the rotor 4a of the rear wheel 4 and an upper limit value of the hydraulic pressure of the brake fluid in the wheel cylinder 24. Note that, during actuation of an anti-lock brake system (ABS), the upper limit value of the braking force that can be distributed to the rear wheel 4 is set to a smaller value than that during a normal time when the anti-lock brake system is not actuated. Accordingly, during the actuation of the anti-lock brake system, the upper limit value determination section 67 applies the smaller value as the upper limit value of the braking force that can be distributed to the rear wheel 4 than that during the normal time.

In step S127, the control section 63 distributes the entire automatic braking force to the rear wheel 4. Just as described, in the control mode in which the motorcycle 100 has such travel posture that the motorcycle 100 travels straight, the control section 63 preferentially distributes the automatic braking force to the rear wheel 4.

In step S129, the control section 63 partially distributes the automatic braking force to the front wheel 3. More specifically, the control section 63 applies the braking force that corresponds to the upper limit value of the braking force that can be distributed to the rear wheel 4 to the rear wheel 4, and applies the braking force that corresponds to a difference between the upper limit value of the braking force that can be distributed to the rear wheel 4 and the automatic braking force to the front wheel 3.

In step S131, the braking operation determination section 68 determines whether the automatic braking operation that is executed in the control mode is the automatic emergency braking operation. If it is determined that the automatic braking operation that is executed in the control mode is the automatic emergency braking operation (step S131/YES), the processing proceeds to step S135. On the other hand, if it is determined that the automatic braking operation that is executed in the control mode is not the automatic emergency braking operation (in other words, the automatic braking operation that is executed in the control mode is the automatic cruise braking operation) (step S131/NO), the processing proceeds to step S133.

More specifically, the braking operation determination section 68 determines whether the automatic braking operation that is executed in the control mode is the automatic emergency braking operation on the basis of the trigger information acquired in step S111. For example, in the case where the trigger information that is used to determine the initiation of the control mode to make the motorcycle 100 execute the automatic emergency braking operation is acquired in step S111, the braking operation determination section 68 determines that the automatic braking operation that is executed in the control mode is the automatic emergency braking operation. Alternatively, for example, in the case where the trigger information that is used to determine the initiation of the control mode to make the motorcycle 100 execute the automatic cruise braking operation is acquired in step S111, the braking operation determination section 68 determines that the automatic braking operation that is executed in the control mode is the automatic cruise braking operation.

Next, in step S133, the control section 63 distributes the automatic braking force in an allocation that the lean angle of the motorcycle 100 can be maintained.

During the turning travel, directions of the braking forces that are applied to the front wheel 3 and the rear wheel 4 differ from each other. For example, in the case where the motorcycle 100 turns to the left with respect to an advancing direction D1 as depicted in FIG. 6, a braking force Ff that is applied to the front wheel 3 has: a component Fxf in a reverse direction from the advancing direction D1; and a component Fyf that is orthogonal to the component Fxf and is directed to the right with respect to the advancing direction D1. Meanwhile, a braking force Fr that is applied to the rear wheel 4 has: a component Fxr in the reverse direction from the advancing direction D1; and a component Fyr that is orthogonal to the component Fxr and is directed to the left with respect to the advancing direction D1. Here, in the case where the motorcycle 100 turns to the left with respect to the advancing direction D1, the motorcycle 100 is tilted to the left with respect to the advancing direction D1. Accordingly, the braking force Ff that is applied to the front wheel 3 acts in a direction to reduce the lean angle of the motorcycle 100 (in other words, a direction to raise the motorcycle 100). Meanwhile, the braking force Fr that is applied to the rear wheel 4 acts in a direction to increase the lean angle of the motorcycle 100 (in other words, a direction to lay the motorcycle 100). In this way, the control section 63 can maintain the lean angle of the motorcycle 100 by appropriately distributing the automatic braking force to the front wheel 3 and the rear wheel 4.

In the case where the lean angle of the motorcycle 100 is large, the motorcycle 100 is likely to fall over by own weight in comparison with a case where the lean angle of the motorcycle 100 is small. Accordingly, for example, in the case where the lean angle of the motorcycle 100 is large, the control section 63 lowers a degree of distribution priority of the braking force to the rear wheel 4 than that when the lean angle of the motorcycle 100 is small, so as to be able to maintain the lean angle of the motorcycle 100.

In step S135, the control section 63 distributes the automatic braking force in an allocation that the lean angle of the motorcycle 100 is reduced with the lapse of time.

As described above, the braking force Ff, which is applied to the front wheel 3, and the braking force Fr, which is applied to the rear wheel 4, have the components that are reverse from each other with respect to the direction orthogonal to the advancing direction D1. Accordingly, the control section 63 can reduce the lean angle of the motorcycle 100 with the lapse of time by appropriately distributing the automatic braking force to the front wheel 3 and the rear wheel 4.

As described above, in the case where the lean angle of the motorcycle 100 is large, the motorcycle 100 is likely to fall over in comparison with the case where the lean angle of the motorcycle 100 is small. Accordingly, for example, in the case where the lean angle of the motorcycle 100 is large, the control section 63 lowers the degree of the distribution priority of the braking force to the rear wheel 4 than that when the lean angle of the motorcycle 100 is small, so as to be able to reduce the lean angle of the motorcycle 100 with the lapse of time.

As described above, in the control mode in which the motorcycle 100 has such travel posture that the motorcycle 100 turns, for example, in the case where the lean angle of the motorcycle 100 is large, the control section 63 lowers the degree of the distribution priority of the automatic braking force to the rear wheel 4 than that when the lean angle of the motorcycle 100 is small.

In step S137, the control section 63 prohibits the automatic braking operation. When prohibiting the automatic braking operation, the control section 63 brings the motorcycle 100 into the normal state where the braking force is applied to the wheels in accordance with the driver's operation. More specifically, the control section 63 brings the motorcycle 100 into a state where the inlet valves 31 are opened, the outlet valves 32 are closed, the first valves 35 are opened, and the second valves 36 are closed, so as to prohibit driving of the pumps 34.

Following step S127, step S129, step S133, step S135, or step S137, in step S139, the acquisition section 61 acquires the trigger information.

Next, in step S141, the trigger determination section 64 determines whether the trigger information has been acquired. If it is determined that the trigger information has been acquired (step S141/YES), the processing returns to step S117. On the other hand, if it is determined that the trigger information has not been acquired (step S141/NO), the processing proceeds to step S143.

As described above, if it is determined in step S141 that the trigger information has been acquired (step S141/YES), the control mode continues, and the processing from step S117 to step S139 is repeated. For example, in the case where the determination result in step S117 is NO in a state where the automatic braking operation is permitted, the control section 63 continues the state where the automatic braking operation is permitted. In this case, the control section 63 controls the distribution of the automatic braking force to the front wheel 3 and the rear wheel 4 in accordance with the travel posture of the motorcycle 100 that is determined in the automatic braking operation.

In step S143, the execution section 62 terminates the control mode.

<Effects of Brake System>

A description will be made on effects of the brake system 10 according to the embodiment of the invention.

In the brake system 10, the control mode that makes the motorcycle 100 execute the automatic braking operation is initiated in response to the trigger information that is generated in accordance with the peripheral environment of the motorcycle 100. In addition, in the control mode, the distribution of the automatic braking force to the front wheel 3 and the rear wheel 4 is controlled in accordance with the travel posture of the motorcycle 100. In this way, the distribution of the automatic braking force to the front wheel 3 and the rear wheel 4 can appropriately be controlled in accordance with the travel posture of the motorcycle 100. Therefore, the safety can be improved by the automatic braking operation while falling of the motorcycle 100 is prevented.

Preferably, in the brake system 10, in the control mode in which the motorcycle 100 has such travel posture that the motorcycle 100 travels straight, the automatic braking force is preferentially distributed to the rear wheel 4. In this way, it is possible to prevent occurrence of pitching motion in such a direction that a rear portion of the motorcycle 100 comes off a road surface with the front wheel 3 being a center by the automatic braking operation. Therefore, falling of the motorcycle 100 can effectively be prevented.

Preferably, in the brake system 10, in the control mode in which the motorcycle 100 has such travel posture that the motorcycle 100 travels straight, in the case where the automatic braking force exceeds the upper limit value of the braking force that can be distributed to the rear wheel 4, the automatic braking force is partially distributed to the front wheel 3. In this way, it is possible to prevent the automatic braking force from becoming insufficient for the target braking force while preventing the occurrence of the pitching motion in such a direction that the rear portion of the motorcycle 100 comes off the road surface with the front wheel 3 being the center. Therefore, the motorcycle 100 can effectively be prevented from collapsing with the forward obstacle.

Preferably, in the brake system 10, in the control mode in which the motorcycle 100 has such travel posture that the motorcycle 100 turns, in the case where the lean angle of the motorcycle 100 is large, the degree of the distribution priority of the automatic braking force to the rear wheel 4 is lowered in comparison with the case where the lean angle of the motorcycle 100 is small. In this way, during the turning travel, falling of the motorcycle 100 by the own weight can effectively be prevented.

Preferably, in the brake system 10, in the control mode in which the motorcycle 100 has such travel posture that the motorcycle 100 turns, in the case where the automatic braking operation is the automatic cruise braking operation, the automatic braking force is distributed in the allocation that the lean angle of the motorcycle 100 is maintained. In this way, it is possible to decelerate the motorcycle 100 while preventing a trajectory on which the motorcycle 100 travels from leaving a travel road.

Preferably, in the brake system 10, in the control mode in which the motorcycle 100 has such travel posture that the motorcycle 100 turns, in the case where the automatic braking operation is the automatic emergency braking operation, the automatic braking force is distributed in the allocation that the lean angle of the motorcycle 100 is reduced with the lapse of time. Here, grounding areas of tires of the motorcycle 100 are increased as the lean angle is reduced. In addition, a friction characteristic in a grounding portion of each of the tires of the motorcycle 100 possibly has such a characteristic that a larger friction force is generated in the advancing direction as the lean angle is reduced. Thus, the automatic braking force can be increased as the lean angle is reduced with the lapse of time. In this way, an increase in a braking distance can be prevented while falling of the motorcycle 100 is prevented. Therefore, the effect of increasing the safety can be enhanced by the automatic emergency braking operation.

The invention is not limited to each of the embodiments. For example, all or parts of the embodiments may be combined, or only a part of each of the embodiments may be implemented. In addition, an order of the steps may be switched, for example.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational frequency sensor
44: Rear-wheel rotational frequency sensor
45: Lean angle sensor
46: Peripheral environment sensor
47: Steering angle sensor
48: Input device 50: Hydraulic pressure control unit
51: Base body
60: Controller
61: Acquisition section
62: Execution section
63: Control section
64: Trigger determination section
65: Avoidance intention determination section
66: Travel posture determination section
67: Upper limit value determination section
68: Braking operation determination section
100: Motorcycle

The invention claimed is:

1. A controller (60) controlling behavior of a motorcycle (100), the controller comprising:
    an acquisition section (61) that acquires trigger information generated in accordance with peripheral environment of the motorcycle (100); and
    an execution section (62) that initiates a control mode in response to the trigger information, the control mode making the motorcycle (100) execute an automatic braking operation, wherein
    in the control mode, distribution of an automatic braking force to a front wheel (3) and a rear wheel (4) is controlled in accordance with travel posture of the motorcycle (100), the automatic braking force being a respective degree of braking force that is applied to each of the respective wheels (3, 4) of the motorcycle (100) by the automatic braking operation according to a lean angle of the motorcycle (100).

2. The controller according to claim 1, wherein in the control mode in which the motorcycle (100) has such travel posture that the motorcycle (100) travels straight, the automatic braking force is preferentially distributed to the rear wheel (4).

3. The controller according to claim 2, wherein in the control mode in which the motorcycle (100) has such travel posture that the motorcycle (100) travels straight, in the case where the automatic braking force exceeds an upper limit value of the braking force distributed to the rear wheel (4), the automatic braking force is partially distributed to the front wheel (3).

4. The controller according to claim 1, wherein in the control mode in which the motorcycle (100) has such travel posture that the motorcycle (100) turns, in the case where the lean angle of the motorcycle (100) is large, a degree of distribution priority of the automatic braking force to the rear wheel (4) is lowered in comparison to a degree of distribution priority of the automatic braking force to the rear wheel (4) in a case where the lean angle of the motorcycle (100) is small.

5. The controller according to claim 1, wherein in the control mode in which the motorcycle (100) has such travel posture that the motorcycle (100) turns, in the case where the automatic braking operation is an automatic cruise braking operation, the automatic braking force is distributed in an allocation between the front wheel (3) and the rear wheel (4) such that the lean angle of the motorcycle (100) is maintained.

6. The controller according to claim 1, wherein in the control mode in which the motorcycle (100) has such travel posture that the motorcycle (100) turns, in the case where the automatic braking operation is an automatic emergency braking operation, the automatic braking force is distributed in an allocation between the front wheel (3) and the back wheel (4) such the respective automatic braking force is increased as that the lean angle of the motorcycle (100) is reduced with lapse of time.

7. A control method controlling behavior of a motorcycle (100), the control method comprising:
    an acquisition step (S111) of acquiring trigger information that is generated in accordance with peripheral environment of the motorcycle (100); and
    an execution step (S115) of initiating a control mode in response to the trigger information, the control mode making the motorcycle (100) execute an automatic braking operation, wherein
    in the control mode, distribution of an automatic braking force to a front wheel (3) and a rear wheel (4) is controlled in accordance with travel posture of the motorcycle (100), the automatic braking force being a respective degree of braking force that is applied to each of the respective wheels (3, 4) of the motorcycle (100) by the automatic braking operation according to a lean angle of the motorcycle (100).

8. A brake system (10) comprising:
    a peripheral environment sensor (46) that detects peripheral environment of a motorcycle (100); and
    a controller (60) that controls behavior of the motorcycle (100) on the basis of the peripheral environment, wherein
    the controller (60) is configured to:
    acquire trigger information generated in accordance with the peripheral environment; and
    initiate a control mode in response to the trigger information, the control mode making the motorcycle (100) execute an automatic braking operation, and
    in the control mode, control distribution of an automatic braking force to a front wheel (3) and a rear wheel (4) in accordance with travel posture of the motorcycle (100), the automatic braking force being a respective degree of braking force that is applied to each of the respective wheels (3, 4) of the motorcycle (100) by the automatic braking operation according to a lean angle of the motorcycle (100).

* * * * *